United States Patent [19]
Dorison et al.

[11] Patent Number: 5,478,407
[45] Date of Patent: Dec. 26, 1995

[54] APPARATUS FOR SHADING SURFACES HAVING A SPREAD ROOF SHEATHING AND PHOTOVOLTAIC ELEMENTS PROVIDED ON SAME

[75] Inventors: Andreas Dorison, Erlangen; Reinhard Wecker, Möhrendorf; Hans-Peter Ganter, Bamberg; Gerd Schmid, Konstanz, all of Germany

[73] Assignee: Wur Gesellschaft fur Vermogensverwaltung mgH, Cologne, Germany

[21] Appl. No.: 175,774

[22] Filed: Jan. 3, 1994

Related U.S. Application Data

[63] Continuation of Ser. No. 813,859, Dec. 26, 1991, abandoned.

[30] Foreign Application Priority Data

Dec. 28, 1990 [DE] Germany .................. 40 42 016.7

[51] Int. Cl.$^6$ ................................. H01L 31/042
[52] U.S. Cl. ............. 136/244; 136/251; 136/293; 52/173.3
[58] Field of Search ............. 52/83, 97, 173.3, 52/573, 200, 63; 136/244, 251, 293

[56] References Cited

U.S. PATENT DOCUMENTS

| | | | |
|---|---|---|---|
| 3,611,649 | 10/1971 | Muller et al. | 52/83 |
| 3,835,603 | 10/1974 | Schnebel | 52/83 |
| 4,175,249 | 11/1979 | Gruber | 323/15 |
| 4,233,085 | 11/1980 | Roderick | 136/244 |
| 4,306,108 | 12/1981 | Henesian | 136/244 |
| 4,677,248 | 6/1987 | Lacy | 52/173.3 |
| 4,835,918 | 6/1989 | Dippel | 52/63 |
| 4,936,063 | 6/1990 | Humphrey | 52/200 |
| 4,966,631 | 10/1990 | Matlin et al. | 136/244 |

*Primary Examiner*—Aaron Weisstuch
*Attorney, Agent, or Firm*—Bachman & LaPointe

[57] ABSTRACT

In an apparatus for shading surfaces, in particular for shading spaces which can be negotiated on foot, or the like, comprising at least a roof sheathing which is stretched on supports or the like carrier elements at a spacing relative to the surface to be shaded, or a corresponding cable netting assembly, as a carrier assembly, on the outside of which are provided photovoltaic elements, the photovoltaic element or solar module is attached to the carrier assembly by intermediate elements with which distortion phenomena of the carrier assembly, which are caused by stretching, can be carried, and external forces can be transmitted to the carrier assembly. In addition a plurality of photovoltaic elements or solar modules of approximately the same orientation are to be connected in series and respective region and the latter are determined by the connected to a regulating system, wherein the solar modules of approximately the same orientation are preferably associated with a respective region and the latter are determined by the direction of incidence of the sunlight to be received, in dependence on the position of the sun.

32 Claims, 5 Drawing Sheets

APPARATUS FOR SHADING SURFACES HAVING A SPREAD ROOF SHEATHING AND PHOTOVOLTAIC ELEMENTS PROVIDED ON SAME

This is a continuation, of application Ser. No. 07/813,859, filed Dec. 26, 1991, now abandoned.

BACKGROUND OF THE INVENTION

The invention relates to an apparatus for shading surfaces or areas, in particular for shading spaces which can be negotiated on foot, or the like, comprising at least a roof sheathing which is stretched on supports or the like carrier elements at a spacing relative to the surface to be shaded, or a corresponding cable netting assembly, as a carrier assembly, on the outside of which are provided photovoltaic elements.

Such an apparatus with silicon crystals which are fixed on the roof sheathing or the cable netting assembly and which are possibly movable relative to each other is described for example in German laid-open application (DE-OS) No 34 27 574. The term photovoltaic elements means, for example, solar cells with a semiconductor plate which in principle is of a double layer configuration, namely an upper negatively doped layer (for example silicon with phosphorus atoms) and a lower positively doped layer (boron atoms). A voltage occurs at an electrical barrier which is provided between the layers, direct current can be taken off directly by way of metal contacts, and can then be adapted to the current mains by inverters. For that reason such photovoltaic elements are also connected directly to current lines.

In accordance with German laid-open application (DE-OS) No 31 42 129, a photovoltaic solar module is strengthened by a galvanized iron wire mesh or gauze which carries a layer of lacquer and is connected to the plastic material enclosing the solar cell, with the interposition of a multi-layer foil as a vapor diffusion barrier. A glass cloth and the electrical lines can extend in the plastic material. Outside the region of its solar cell, which is backed by stiff material, that solar module is capable of being adapted to curved rigid surfaces such as uneven ground, motor vehicle roofs, rock faces, house fronts or the like, and such adaptation to the curved configuration therefore occurs, in such a way as to define the appropriate shape, on a single occasion, namely when the assembly is fitted in position. For, movable non-rigid curved surfaces, solar modules of that kind are just as unsuitable as photovoltaic layers of amorphous silicon or of cadmium derivatives, in accordance with U.S. Pat. No. 3,411,050.

In accordance with German laid-open application (DE-OS) No 34 27 574, those elements which are combined together in solar modules are applied to vibrating or oscillating roofing systems of large area. The particular circumstances of such structures which are referred to as 'lightweight areal load-bearing assemblies' give rise to specific requirements in regard to fixing of the solar modules. The following limit values which are governed by snow and wind loading are specified by the specification IEC 504 from the Commission of the European Community, in respect of upstanding roof surfaces which are suitable for the use of solar modules:

Suction forces 2400N/m^2;
Pressure forces 5400N/m^2;
Shearing forces at 60° C.—angle of pitch 5000N/m^2.

Membranes of mesh-like or netting-like fabrics or cable netting assemblies as represents, for example, the roofing of the Olympic Stadium in Munich are usually fitted in a point-like fashion on steel pylons or towers and stretched by means of what are known as bracing riggings to provide cross-sectionally curved, synclastic or anticlastic surfaces. In spite of the prestressing forces applied to them, they experience further slight stretching movements under the effect of snow and wind loadings and thus perform what might be called a breathing motion. The following conditions can apply regarding the stretch effects that occur:

| | |
|---|---|
| *Membrane carrier assemblies: | in the warp direction 1–3%; in the weft direction 1–5%; angular displacement up to 10 degrees; |
| **Cable netting carrier assemblies | Stretch effects up to 1%; angular displacement up to 10%. |

That means that rigid solar modules which are fitted on lightweight areal carrier assemblies must be provided with a fixing mode which can permit the described movements.

In consideration of those factors, the inventors set themselves the aim of so improving an apparatus of the kind discussed above that the photovoltaic solar modules are secured in relation to the above-indicated forces, on the one hand, but on the other hand they are also capable of accommodating the displacements caused by the suspension configuration.

SUMMARY OF THE INVENTION

In accordance with the invention, rigid but also flexible photovoltaic elements are to be permanently applied to lightweight areal carrier assemblies of large area and in that respect the movements of the substructure can be compensated by a specific fixing mode in order substantially to broaden the range of uses of lightweight areal carrier assemblies. In the ideal situation the module passes forces into the membrane, without themselves being loaded by membrane deformation, that is to say, optimization is by way of a minimization in the forces applied to the photovoltaic modules by the suspension assembly.

The invention therefore provides for fixing of photovoltaic solar modules on lightweight areal carrier assemblies, which can accommodate the stretching effects of the carrier assemblies but which at the same time passes the snow and wind forces of the applied solar modules to the carrier assembly. For that purpose, cast on to the rear side of the respective module is a soft plastic base or support of adequate diameter, whose Shore hardness is preferably between 20 and 30 Shore A when the module is of a size measuring, for example, 500×1000 mm. It is not possible here to use series screwing means for the solar modules in the edge region of the module frame as, when employing a very dense arrangement, buffers or fixing means would mutually impede each other or have to be arranged in mutually displaced relationship.

BRIEF DESCRIPTION OF THE DRAWINGS

Further advantages, features and details of the invention will be apparent from the following description of preferred embodiments and with reference to the drawings in which.

DETAILED DESCRIPTION OF PREFERRED EMBODIMENTS

Figure 1:
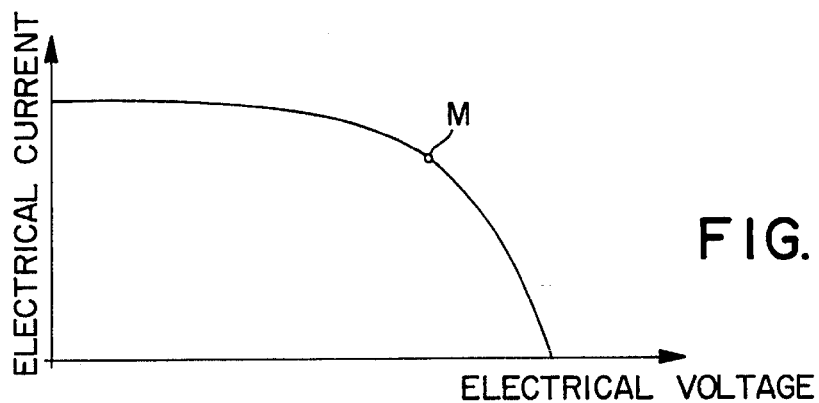
FIGS. 1 through 4 show four graphs with different characteristics.

In accordance with the invention, buffers of fixing means or supports are screwed on to cable netting assembly nodes of junctions or a large-area cable netting assembly or are connected to a membrane which is stretched over a large area.

It has been found advantageous for what are known as sliding clamps to be arranged on the standard frames of the solar modules, and for one or two of the fixings each to be in the form of a rigid hard connection in order in that way, by virtue of the combination of a fixed point and a plurality of sliding locations, to compensate for the movement of the sub-structure relative to the solar module by way of the other sliding clamps.

In an advantageous configuration, it is possible to use a three-point fixing in which a rigid plate which is glued in position, on the rear side of the module, is disposed in opposite relationship to two buffers or two sliding clamps. By virtue of the omission of a fourth fixing point, there is no longer any need for a degree of freedom in the fixings which permit movements; it is only when a four-point mounting system is used that compensation in respect of height is required, for example by means of a sliding clamp.

In relation to solar modules of the order of magnitude of about 500×1000 mm, a two-point fixing has proved its worth, with which the solar module is secured on cable netting nodes or junctions or on a weft thread or yarn of a membrane-type carrier assembly; therefore, there is no longer any need to provide for compensation for movements, in relation to relatively rigid sub-structures. The movements which occur here in the region of the solar modules are minimal.

Bars may serve for fixing the solar module to cable netting assembly nodes or junctions, in which case one of the fixings is rigid and the other permits compensating movements.

When using membranes which are stretched over a large area, disk means are used for transmission of the fixing forces, for example with flat metal or plastic disk members with a corresponding screw means, which clamp the membrane and thus prevent a stamped hole from tearing out.

The disk means or clamping surfaces advantageously have rough surface structures which increase the amount of friction. They may also be plates of a roof-shaped configuration, with which the membrane is clamped in the edge region of the plate.

In accordance with a further feature of the invention, a groove and tongue may be provided in the edge region of the plates in order also in that way to provide for clamping of the membrane in the edge region. It is also advantageous to insert O-rings into corresponding grooves in the edge region of the plates in order to provide for improved clamping of the membrane.

By virtue of the predetermined configuration of the solar modules, they can be positioned on cable netting assemblies or tent membranes, not in one plane. That involves differences in orientation, whereby the solar modules of the installation are irradiated to different degrees of intensity. In accordance with the invention, the output voltage is now increased by a series connection of a plurality of solar modules which as far as possible are directed in the same direction, in geographical terms. In order to make optimum use of a solar generator, the working point must always be at what is known as the Maximum Power Point (MPP).

In addition, there is the danger that the regulating system senses the characteristic in the region of another maximum and does not reach the MPP-point with the maximum power level. That is prevented by the choice in accordance with the invention of a low installation voltage.

In accordance with the teaching of the invention, in a photovoltaic installation, solar modules of approximately the same orientation are connected together to form lines. In addition the installation is divided into regions and each region has its own MPP-regulator associated therewith. In that way the optimum working point for each region is set.

By virtue of the spatially curved movable carrier surface being divided into regions, the entire installation can be adapted to the movement of the sun; in the morning the region which is directed towards the East operates at the optimum working point, during the midday period the central region is afforded optimum irradiation while in the afternoon it is the region which is towards the West which supplies the greatest power. None of those regions is influenced by the others.

The output voltages of the individual MPP-regulators can be fixed to a value and thus feed a common load or consumer or battery storage device. A conventional MPP-regulator comprises a plurality of power portions. Therefore only additional regulating units would be necessary.

When partial shading effects occur (due to trees, buildings etc), only the relevant region would be influenced; the other regions continue to operate at the MPP-point and produce the maximum power.

It has been found in accordance with the invention that such an installation with solar modules which are oriented in different fashions can be considered to be optimized when the number of series-connected solar modules is kept as low as possible;

the installation is divided into small parallel connected regions which take account of the path of movement of the sun; and those parallel-connected regions are more substantially optimized by MPP-regulating systems for each region.

Overall, the foregoing teaching considerably improves the economy of photovoltaic installations; it is determined not only by the solar cells and secondary components of the electrical installation, but also by the support or suspension means for the solar modules. The support or suspension means can constitute up to 30% of the overall costs of a photovoltaic installation. The solar modules which are applied in cable netting assemblies can in themselves be regarded as inexpensive solar module suspension means. Furthermore, solar cells which are already connected to form modules and encapsulated can be mounted in position with the fixing systems according to the invention.

The solar modules are slightly flexibly suspended so that high-frequency vibrations or oscillations as can occur when using rigid fixings on frame structures of larger sizes are eliminated. The specific acceleration forces which arise out of the first derivative of the oscillation frequency are thus reduced by the factor $1/\Omega$ and are further attenuated by the solar modules.

FIG. 1 shows, in a planar co-ordinate system with the ordinate I (=electrical current strength) and the abscissa U (=electrical voltage) the overall characteristic of a group of uniformly directed solar modules. Reference M identifies what is known as the Maximum Power Point (=MPP).

Figure 2:
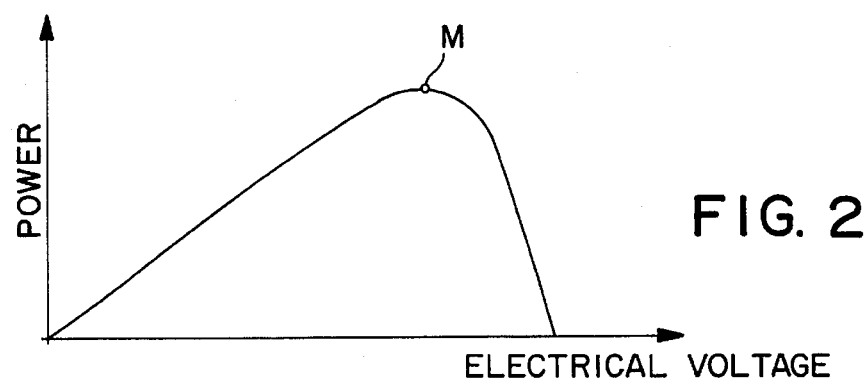

FIG. 2 plots in relation to the electrical voltage U the power P for uniformly directed solar modules, with the point M at the maximum of the curve; with optimum utilization of the solar generator, that is the position of the working point for the adjustable solar modules. For that purpose, a regulating system (not shown) of an MPP-regulator senses the characteristic of the solar generator. The power is calculated from the respective current and voltage values. If the power is greater at the next point sensed, the sensing direction is maintained; if it is lower, sensing is effected in the opposite direction and in that way the MPP-point is found and retained.

Figure 3:
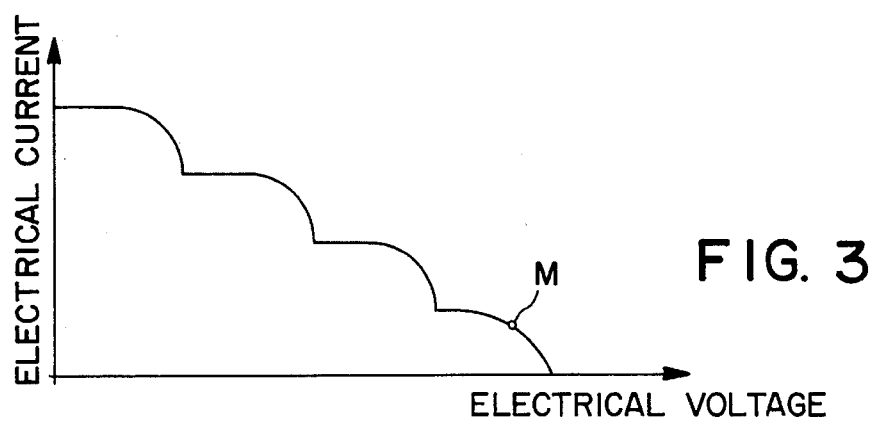
Figure 4:
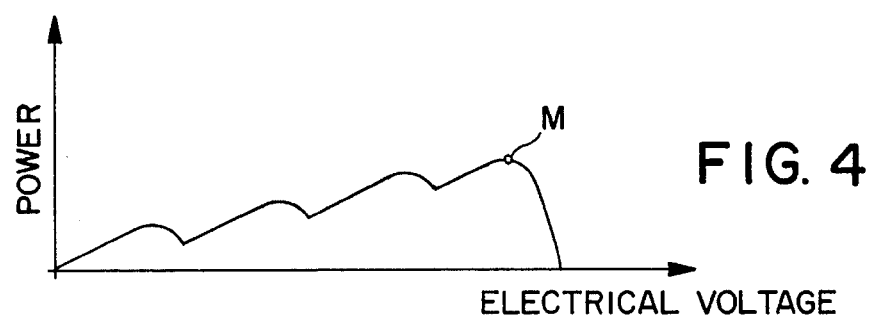

The overall characteristic as shown in FIG. 1, for solar modules directed in different ways, is shown in FIG. 3; in this case the overall characteristic is deformed. At the MPP-point of that interconnection arrangement the power is lower than with solar modules which are uniformly directed, as is shown by the power curve in FIG. 4.

Figure 5:
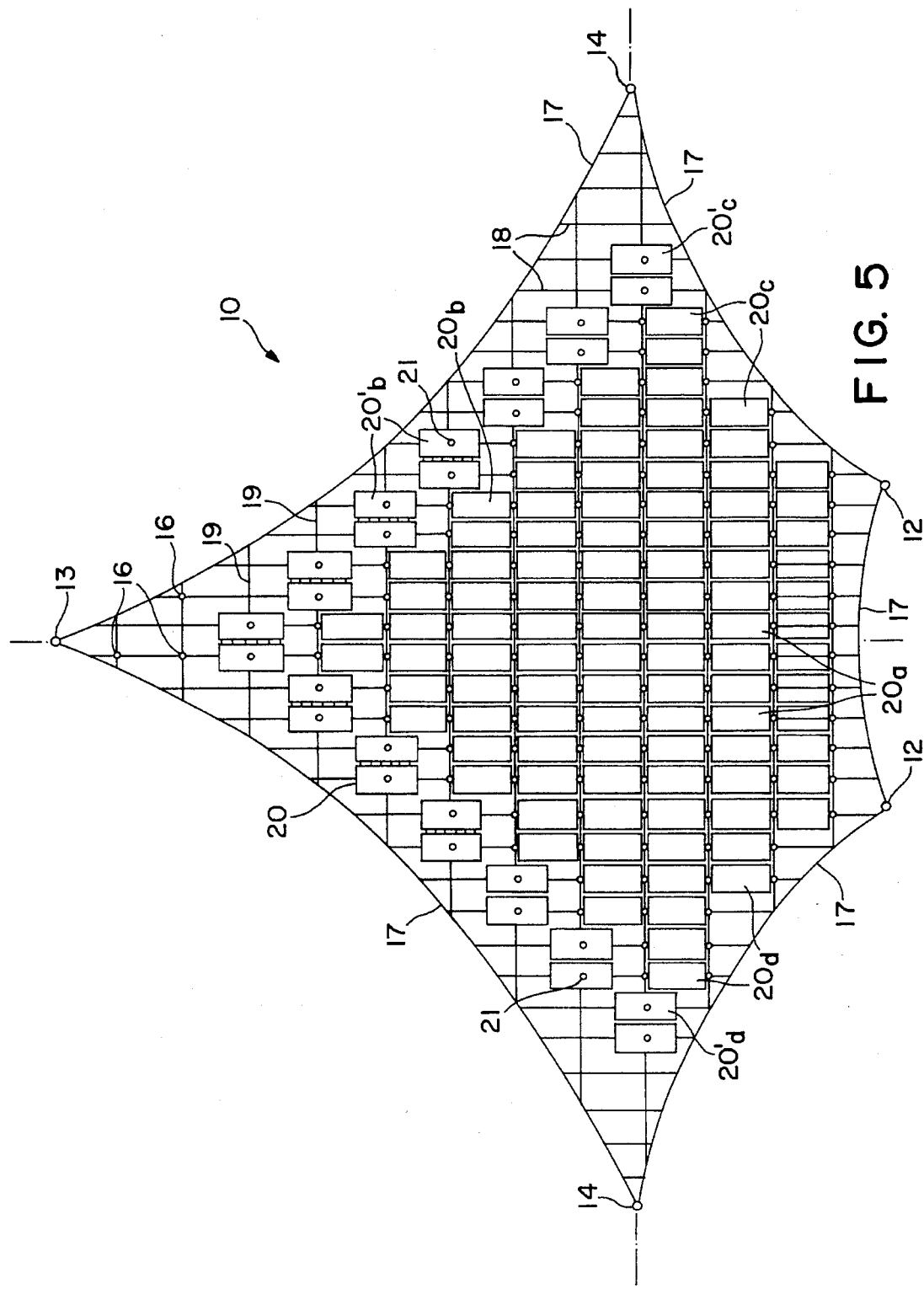
FIG. 5 is a plan view of a cable netting arrangement as a roof surface with solar modules arranged thereon, in four groups.

In order to produce characteristics as shown in FIGS. 1 and 2, solar modules 20 are fixed to cable netting nodes or junctions as indicated at 16, on a cable netting assembly 10 which is erected in a curved configuration between two high points 12, a high point 13 at a greater spacing from the ground, and two low points 14, as shown in FIG. 5. The position of the cable netting nodes or junctions 16, of which only a few can be seen from FIG. 5, is determined by internal cables 18 and 19 which cross within edge cables 17.

The solar modules 20 are respectively combined together into regions or areas indicated at $20_a$ to $20_d$; the central region $20_a$, for a large part also the region $20_b$, faces towards the zenith, and thus receives, in particular, midday sun. In contrast, the regions $20_c$ and $20_d$, respectively, are here more associated with the East and the West, respectively, and therefore receive morning and evening sun, respectively. The solar modules $20'_b$, $20'_c$, $20'_d$ which are adjacent to the edge cables 17 between the tensioning points 13 and 14 are connected by means of central connecting members 21 to the cable netting nodes or junctions 16, while the other solar modules $20_a$ through $20_d$ are respectively associated with a mesh area which is defined by four cable netting nodes or junctions 16, that is to say, the narrow sides of their module frames (not shown in FIG. 5) here extend above the internal cables 19 and each lie with their longitudinal axis on a respective cable netting node or junction 16.

The drawing also does not show current lines connecting at least four respective solar modules 20 of a region together, and the connections thereof to a current receiving means.

Figure 6:
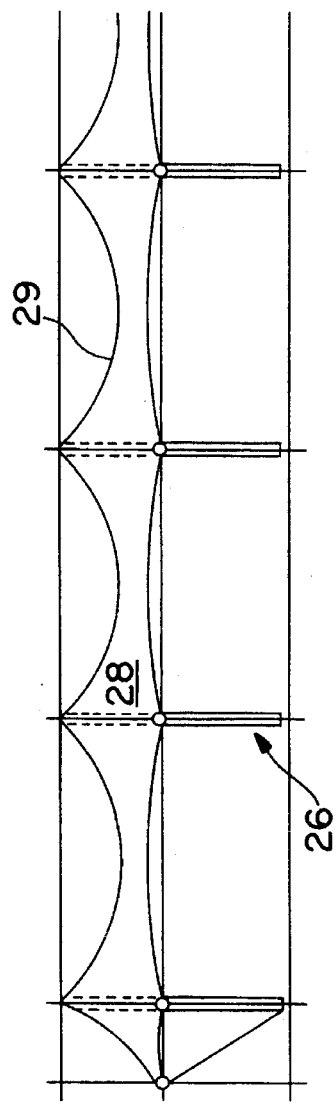
FIG. 6 is a side view of a roof sheathing which is erected in the form of an arcade of wave-like configuration.
Figure 7:
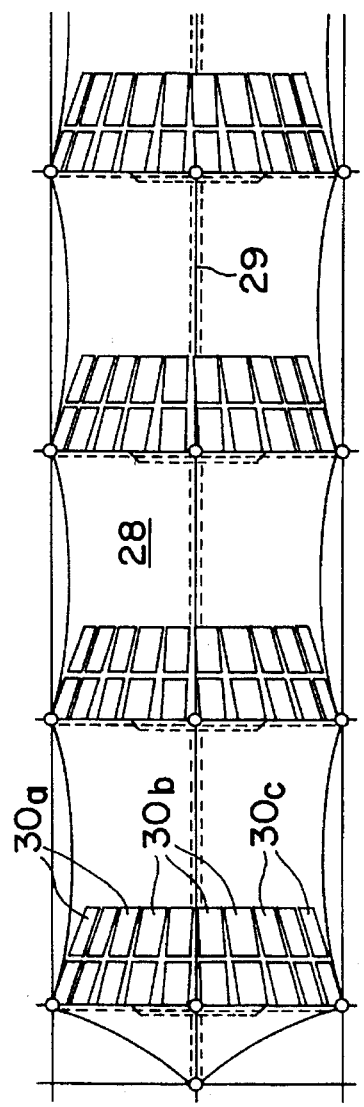
FIG. 7 is a plan view of FIG. 6 with solar modules disposed on the roof sheathing, in three groups.
Figure 8:
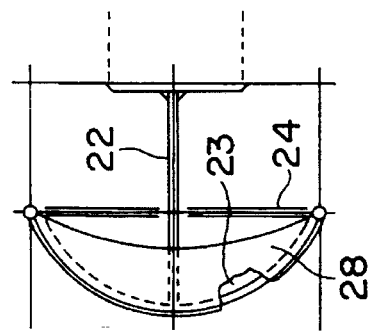
FIG. 8 is a side view of FIGS. 6 and 7 (turned through 90°)

Both in this installation and also in a further installation as shown in FIGS. 6 through 8, the working voltage is fixed at 48 V, for which purpose there are always four solar modules 20 connected in series.

A structure referred to as a wave-like arcade, as shown in FIGS. 6 through 8, comprises a carrier structure 26 which includes vertical supports 22 and arcuate stretcher members 23 on horizontal bearers 24, and a roof sheathing 28 which is stretched over the structure 26 and which forms a ridge 29 of a catenary curve-like configuration. Solar modules 30 are arranged in three groups $30_a$, $30_b$, $30_c$ on the roof sheathing 28, on the side of the arcuate stretcher member 23 which is directed towards the South; of the groups of solar modules 30, the middle group $30_b$ receives solar energy, in particular, at midday while the flanking groups $30_a$ and $30_c$ receive solar energy prior to midday and after midday.

Figure 9:
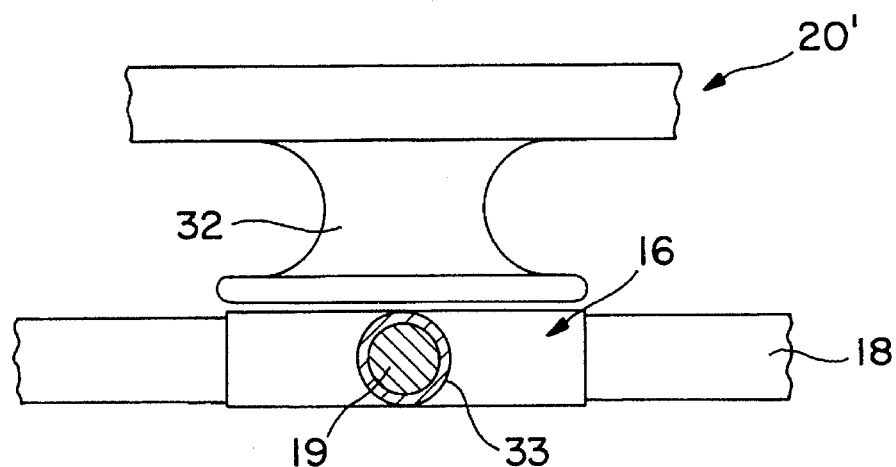
FIGS. 9 and 10 are sectional views on an enlarged scale of details from cable netting assemblies, with a part of a solar module.
Figure 12:
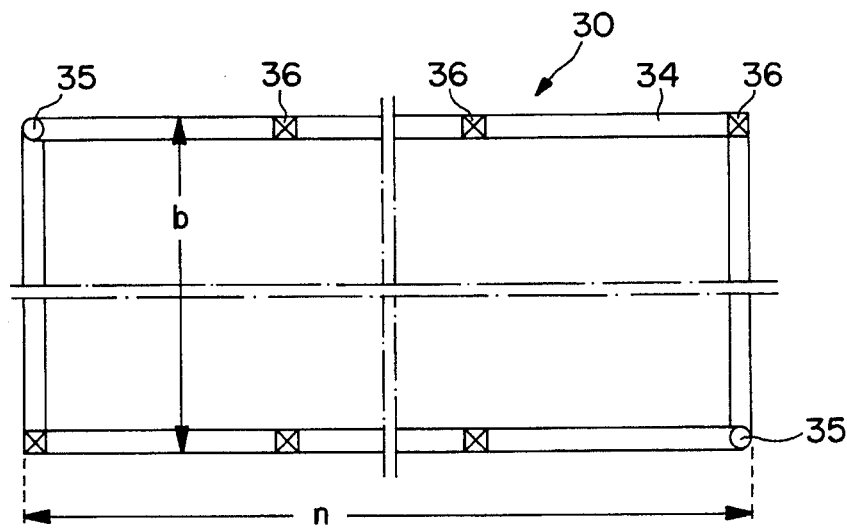
FIG. 12 is a plan view of a solar module.

The solar module 20' shown in FIG. 9 can be fixed to the cable netting assembly 10, for example, by a plastic base or support 32 which is screwed to sleeves 33 at the cable netting node or junction 16, and acts as a buffer. Its Shore hardness is between about 20 and 30 (Shore A), for example, for a solar module 20 of a length n of 1000 mm and a width b of 500 mm, as shown in FIG. 12.

Figure 10:
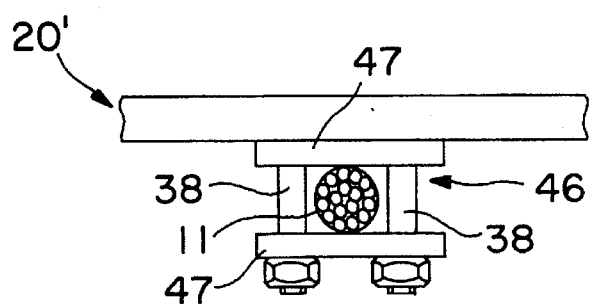

FIG. 10 shows a solar module 20' on a cable 11 of a cable netting assembly 10; it is fixed to the cable 11 by a cable clamp 46 with clamping plates 47 which are disposed on both sides of the cable 11 and which are connected by screws 38. The clamping connection 11/46 slides, as from a defined force acting on the solar module 20'.

In order to be able to carry shearing forces, one of the fixing points should be rigid whereas the other fixing points carry only pressure or suction forces. The combination of fixed points with sliding regions, at cable or sliding clamps 46, provides for compensation in respect of the movements of the sub-structure 10, 28 with respect to the solar module 20, 30.

Figure 11:
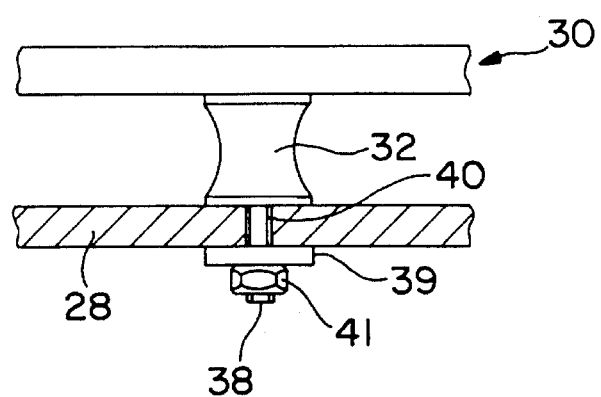
FIG. 11 is a sectional view of an enlarged scale of a detail from a roof sheathing.

The solar module 30 shown in FIG. 11 is fixed with the interposition of the above-described plastic base or support 32 on a membrane-like roof sheathing 28 by means of screws 38 which pass through stamped-out holes 40 and support plates 39 and can be tightened by way of a nut 41.

In that way a module frame 34 of the solar module 30 which is shown in plan view in FIG. 12 can be fixedly connected to the supporting roof sheathing 28 (not shown here) at the locations 35 whereas at locations 36 it can be mounted slidably by virtue of sliding clamps.

Figure 13:
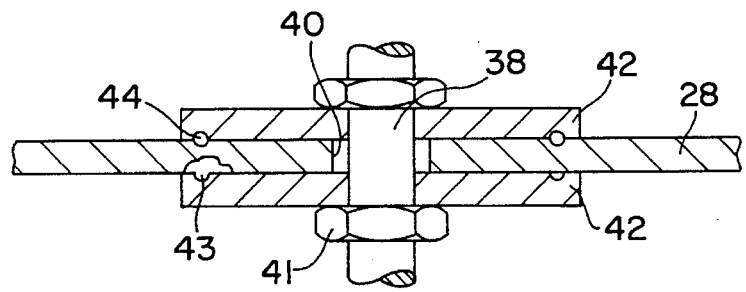
FIG. 13 is a view in section through a part of a roof sheathing.

FIG. 13 also shows in diagrammatic form the manner of fixing a solar module 30 to the roof sheathing 28 by means of a screw 38; the roof sheathing 28 is held around the hole 40 through which the screw 38 passes, on both sides, by clamping plates 42 which are disposed between the nuts 41 and which have grooves 43 receiving O-rings 44.

Figure 14:
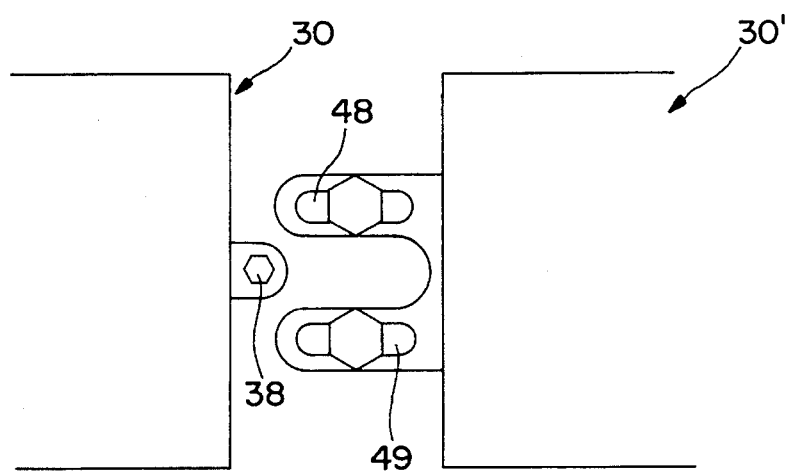
FIG. 14 is a plan view of an arrangement of two solar modules.

Finally, FIG. 14 shows two adjacent solar modules 30, 30' of which the left-hand one is provided with a fixing screw 38 and the right-hand one is provided with a sliding clamp 49 having slots 48.

We claim:

1. An apparatus for shading surfaces, comprising:

a carrier assembly;

a roof sheathing means which is stretched on the carrier assembly at a spacing relative to a surface to be shaded, said roof sheathing means having an outside surface with photovoltaic elements mounted therein, the photovoltaic elements being arranged in groups in a plurality of regions, wherein said elements of each of said groups have substantially the same orientation, wherein the elements of at least one of said groups in one of said regions are arranged in an orientation different than an orientation of elements of another of said groups in another of said regions, wherein each of said orientations of each of said groups is adapted to position said photovoltaic elements relative the sun so as to acquire maximum irradiation of the photovoltaic elements comprising each group at a particular position of the sun and at a particular time of the day such that said at least one of said groups and said another of said groups acquire maximum irradiation at different times of the day; and a plurality of intermediate elements, wherein each of the photovoltaic elements are attached to the roof sheathing by at least one of the intermediate elements, wherein the intermediate elements are comprised of a soft plastic base which functions as a vibration absorbing buffer.

2. The apparatus according to claim 1, wherein the roof sheathing means comprises at least one of a cable netting assembly node of a large-area cable netting assembly and a membrane-like roof sheathing and the intermediate elements are screwed onto the roof sheathing means.

3. The apparatus according to claim 2, wherein the photovoltaic elements are fixed at points including at least one of the cable netting assembly nodes of the cable netting assembly and a weft thread of the membrane-like roof sheathing.

4. The apparatus according to claim 2, wherein the intermediate elements further comprise at least one of bars and plates which are fixed to the cable netting assembly nodes by fixing means, wherein the fixing means is rigid and relative movements between the photovoltaic element and carrier assembly are performed by other fixing means.

5. The apparatus according to claim 2, wherein the intermediate elements further include disk member means for clamping the photovoltaic elements to the roof sheathing means, which disc member means are screwed on the roof sheathing means, wherein the disk member means are positioned on both sides of an opening provided in the roof sheathing means.

6. The apparatus according to claim 5, wherein the disk member means are flat and have a screw passing therethrough.

7. The apparatus according to claim 5 wherein the disk member means include clamping surfaces which have rough surface structures.

8. The apparatus according to claim 5, wherein the cross section of the disk member means is a roof-shaped configuration having edge regions, wherein the clamping of the roof sheathing means is applied from the edge region of disk member means.

9. The apparatus according to claim 5, wherein the disk member means include an edge region having a groove and tongue.

10. The apparatus according to claim 5, wherein the disk member means include edge regions having O-rings positioned therein.

11. The apparatus according to claim 1, wherein the intermediate elements have a Shore A hardness of between 20 and 30.

12. The apparatus according to claim 1, wherein the photovoltaic elements include sliding clamps mounted thereon and wherein the photovoltaic elements are connected to the roof sheathing means via the intermediate elements which form rigid connections and fixing points which are adapted to exclusively carry pressure or suction forces, wherein movements of the carrier assembly are compensated by way of said sliding clamps.

13. The apparatus according to claim 12, wherein the photovoltaic elements are fixed at three points which include a plate which is rigidly glued on the photovoltaic elements and at least one of the intermediate elements and the sliding clamps.

14. The apparatus according to claim 1, further including electrical delivery lines issuing from the photovoltaic elements provided in cable ducts which are welded on the carrier assembly.

15. The apparatus according to claim 1, wherein the photovoltaic elements are mounted on a carrier assembly of limited flexibility and wherein a plurality of said photovoltaic elements of approximately the same orientation in each of said groups are connected in series and are connected to a regulating system.

16. The apparatus according to claim 15, wherein photovoltaic elements of approximately the same orientation are associated with a respective region determined by the direction of incidence of the sunlight to be received, in dependence on the position of the sun.

17. The apparatus according to claim 16, wherein the groups of photovoltaic elements having different orientations and located in different regions are connected in parallel.

18. The apparatus according to claim 16, wherein at least four photovoltaic elements are connected in series to form a group with the operating voltage of substantially 48 V.

19. The apparatus according to claim 16, wherein at least one region includes a MPP-regulator.

20. The apparatus according to claim 19, wherein the output voltages of the MPP-regulators are fixed at a value and feed a common storage means.

21. The apparatus according to claim 1, wherein a at least one photovoltaic element is exclusively supported via an individual one of the intermediate elements.

22. The apparatus according to claim 1, wherein said carrier assembly is shaped so that each region of said plurality of regions is positioned relative to each other region of said plurality of regions so as not to interfere with the maximum irradiation of said groups of photovoltaic elements of said plurality of regions.

23. The apparatus according to claim 22, wherein said carrier assembly comprises:

a highest central region including said photovoltaic elements directed toward a zenith position of the sun, said photovoltaic elements of said highest central region adapted to acquire maximum irradiation with the sun at said zenith position;

a first side region angled downwardly from said central region and including said photovoltaic elements directed toward an eastern position of said sun, said photovoltaic elements of said first side region adapted to acquire maximum irradiation with the sun at said eastern position; and a second side region angled downwardly from said central region and including said photovoltaic elements directed toward a western position of said sun, said photovoltaic elements of said second side region adapted to acquire maximum irradiation with the sun at said western position;

wherein said highest central region does not interfere with said first and second side region by blocking any sunlight originating from said eastern and western position and wherein said first and second side region does not interfere with said highest central region by blocking any sunlight originating from said zenith position.

24. The apparatus according to claim 1, wherein at least one of said photovoltaic elements includes an intermediate element positioned entirely under said at least one photovoltaic element so as to allow unobstructed incidence of sunlight on said at least one photovoltaic element.

25. An apparatus for shading surfaces, comprising:

a carrier assembly;

at least one of a cable netting assembly node and a membrane-like roof sheathing stretched on the carrier assembly at a spacing relative to the surface to be shaded, the at least one of the cable netting assembly node and the membrane-like roof sheathing having an outside surface with photovoltaic elements thereon; and a plurality of intermediate elements, wherein each of the photovoltaic elements are attached to the at least one of the cable netting assembly node and the membrane-like roof sheathing by at least one of the intermediate elements, wherein the intermediate elements are comprised of a soft plastic base which functions as a vibration absorbing buffer and the intermediate members are further comprised of disk member means for clamping the photovoltaic elements to the at least one of the cable netting assembly node and the membrane-like roof sheathing, wherein the disc member means are screwed on the at least one of the cable netting assembly node and the membrane-like roof sheathing and are positioned on both sides of an opening provided in the at least one of the cable netting assembly node and a membrane-like roof sheathing.

26. The apparatus according to claim 25, wherein each of the disk member means is flat and has a screw passing therethrough.

27. The apparatus according to claim 25, wherein each of the disk member means includes a clamping surface which has a rough surface structure.

28. The apparatus according to claim 25, wherein the cross section of each of the disk member means is a roof-shaped configuration having an edge region and wherein the clamping of the at least one of the cable netting assembly node and the membrane-like roof sheathing is applied from the edge region of the disk member means.

29. The apparatus according to claim 25, wherein each of the disk member means includes an edge region having a groove and tongue.

30. The apparatus according to claim 25, wherein each of the disk member means include an edge region having an O-ring positioned therein.

31. An apparatus for shading surfaces, comprising:

a carrier assembly of limited flexibility;

roof sheathing means stretched on the carrier assembly at a spacing relative to the surface to be shaded, the roof sheathing means having an outside surface with photovoltaic elements thereon; and a plurality of intermediate elements, wherein each of the photovoltaic elements are attached to roof sheathing means by at least one of the intermediate elements, wherein the intermediate elements are comprised of a soft plastic base which functions as a vibration absorbing buffer, wherein a plurality of the photovoltaic elements are arranged in a region in the same orientation and are connected in series and to an MPP-regulator, wherein the orientation of the region is determined by incidence of sunlight to be received and in dependence on the position of the sun.

32. The apparatus according to claim 31, wherein the output voltages of the MPP-regulators are fixed at a value and feed a common storage means.

* * * * *